United States Patent
Kim et al.

(10) Patent No.: US 9,969,630 B2
(45) Date of Patent: May 15, 2018

(54) METHOD FOR TREATING WASTE WATER CONTAINING FLUORINE COMPONENT

(71) Applicant: DAELIM INDUSTRIAL CO., LTD., Seoul (KR)

(72) Inventors: Myeong Seok Kim, Sejong (KR); Min Sup Park, Daejeon (KR); Sang Uk Jung, Jeollabuk-do (KR); Myoung Gi Cho, Jeollanam-do (KR); Seong Mu Oh, Jeollanam-do (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 0 days. days.

(21) Appl. No.: 14/440,516

(22) PCT Filed: Nov. 6, 2013

(86) PCT No.: PCT/KR2013/009977
§ 371 (c)(1),
(2) Date: May 4, 2015

(87) PCT Pub. No.: WO2014/073839
PCT Pub. Date: May 15, 2014

(65) Prior Publication Data
US 2015/0307376 A1 Oct. 29, 2015

(30) Foreign Application Priority Data

Nov. 7, 2012 (KR) .................. 10-2012-0125396

(51) Int. Cl.
*C02F 1/52* (2006.01)
*C02F 1/02* (2006.01)
*C02F 101/14* (2006.01)
*C02F 103/38* (2006.01)
*C02F 101/10* (2006.01)

(52) U.S. Cl.
CPC .............. *C02F 1/5236* (2013.01); *C02F 1/02* (2013.01); *C02F 1/5245* (2013.01); *C02F 2101/108* (2013.01); *C02F 2101/14* (2013.01); *C02F 2103/38* (2013.01); *C02F 2209/02* (2013.01)

(58) Field of Classification Search
CPC ..................................................... C02F 1/5236
See application file for complete search history.

(56) References Cited

U.S. PATENT DOCUMENTS

| | | | |
|---|---|---|---|
| 3,959,132 A | 5/1976 | Singh | |
| 4,045,339 A | 8/1977 | Korenowski et al. | |
| 5,043,072 A * | 8/1991 | Hitotsuyanagi | B01D 61/16 210/638 |
| 2003/0088135 A1* | 5/2003 | Yun | C08F 10/08 585/525 |
| 2004/0217062 A1* | 11/2004 | Yada | C02F 1/52 210/721 |
| 2006/0231472 A1* | 10/2006 | Umezawa | C02F 1/44 210/202 |

FOREIGN PATENT DOCUMENTS

| | | | |
|---|---|---|---|
| JP | 07232915 A | 9/1995 | |
| JP | 2912934 B2 | 12/1995 | |
| JP | 07328645 * | 12/1995 | ............... C02F 1/58 |
| JP | 07328645 A | 12/1995 | |
| JP | 2858478 B | 2/1999 | |
| JP | 2000-189980 A | 7/2000 | |
| KR | 100960363 B | 5/2010 | |

OTHER PUBLICATIONS

International Search Report dated May 12, 2015 corresponding to application No. PCT/KR2013/009977.

* cited by examiner

*Primary Examiner* — Peter Keyworth
(74) *Attorney, Agent, or Firm* — Nath, Goldberg & Meyer; Tanya E. Harkins; Joshua B. Goldberg

(57) ABSTRACT

A method for removing the fluorine component from waste water which is produced during the manufacturing process of highly reactive polybutene and contains high concentration of fluorine component, is disclosed. The method comprises a step of adding to the waste water a treating agent selected from a group of Al compound, Ca compound and mixture thereof at temperature of 50 to 300° C. for reaction, whereby boron trifluoride neutralized salt is decomposed to form Al salt or Ca salt of fluorine component so that the fluorine component is removed in the form of the Al salt or the Ca salt of fluorine component.

3 Claims, No Drawings

METHOD FOR TREATING WASTE WATER CONTAINING FLUORINE COMPONENT

FIELD OF THE INVENTION

This invention relates to a method for treating waste water containing fluorine component, and more particularly to a method for removing the fluorine component from waste water which is produced during the manufacturing process of highly reactive polybutene and contains high concentration of fluorine component.

BACKGROUNDS OF THE INVENTION

Generally, polybutene is prepared by the polymerization of C4 olefins derived during the naphtha cracking under Friedel-Craft type catalyst. The number-average molecular weight (Mn) of polybutene produced in this way is about 300 to 5000. The reactivity of isobutene is highest in olefin components of $C_4$ raffinate-1 so that the produced polybutene is mainly composed by isobutene unit. In the past, polybutene had been used as an adhesive, a glue or an insulating oil so that the product with low reactivity was preferred. However, recently, polybutene to which polar group is introduced is used as an anti-scuff agent, a viscosity index improver etc. or polybutene which is mixed with fuel of an internal combustion engine such as vehicles is used as a refresher.

Most popular material among the products prepared by introducing the polar group into polybutene, is PIBSA (polyisobutenyl succinic anhydrides), which is prepared by reacting polybutene with maleic anhydride. From PIBSA, various lubricant additives and fuel fresheners are prepared. In preparing PIBSA, the nearer to the ends of polybutene a double-bond of polybutene is, the higher a product yield of PIBSA is. On the other hand, in case of the double-bond being inside polybutene, the more the number of alkyl group being substituted on the double-bond is, the lower the reactivity for PIBSA is, owing to steric hindrance thereof, and thus the product yield of PIBSA is reduced. Therefore, studies have been actively performed for preparing high reactive polybutene containing vinylidene of 50% or more, preferably 80% or more.

As a Friedel-Craft type catalyst for preparing high reactive polybutene containing high content vinylidene, boron trifluoride ($BF_3$) is generally used. In polybutene polymerization using a catalyst of boron trifluoride, the reaction product discharged from an exit of the reactor was washed with basic aqueous solution for non-activating and decomposing the catalyst, after the polymerization reaction. The waste water generated at this time contains fluorine components such as HF, boron trifluoride neutralized salt etc. and the concentration of fluorine components in the waste water is very high, for example 5,000~20,000 ppm, which is varied according to the reaction type. The fluorine is very harmful to aquatic life and human body and therefore the amount of fluorine in the industrial waste water had been strickly regulated.

Most general method for reducing the amount of fluorine contained in the waste water is a Ca-compound addition (Japanese Patent No. 2858478). In this method, Ca compound such as $Ca(OH)_2$, $CaCl_2$ etc. is added to the waste water, and the fluoride is precipitated in the form of insoluble calcium fluoride ($CaF_2$) to remove the fluorine. However, when this method is applied to the waste water containing very high concentration of fluorine, which is produced in the preparing the high reactive polybutene, the remaining amount of fluorine is about 500 to 2,000 ppm and it is not possible to reduce the fluorine content to the desired level. In other way, Al compound having strong affinity for the fluoride is used together with Ca compound, and fluorine component in the waste water can be further removed. However, even in this case, the fluorine content cannot be reduced to the desired level (for example 15 ppm). Since these methods use large amount of Ca compound and Al compound, they have disadvantages of cost for treating waste water being too much and of the amount of sludge, that is precipitation, being increased. The reason why these methods are not effective is that in the waste water exists boron trifluoride neutralized salt which is not removed with the conventional methods. The boron trifluoride neutralized salt is not measured by the general fluorine measurement. But, the salt can be analyzed by adding aqueous sulfuric acid to the waste water and then heating the waste water at 140 to 170° C. so as to decompose. It has been revealed from the analysis that about 10% (500 to 2,000 ppm) of fluorine component contained in the waste water is boron trifluoride neutralized salt. On the other hand, there is another method which uses large amount of diluting water for diluting waste water so as to reduce the amount of fluorine component. However, such a diluting method not only needs additional steps and facilities for diluting but also costs too much in treating waste water and cannot reduce the fluorine discharge amount in the unit process.

SUMMARY OF THE INVENTION

Therefore, it is an object of the present invention to provide a method for effectively and economically reducing fluorine components from waste water containing high concentration of fluorine components.

It is another object of the present invention to provide a method for treating waste water which is produced during the preparation process of highly reactive polybutene and contains high concentration of fluorine component.

In order to achieve these objects, the present invention provides a method for treating waste water comprising a step of adding to the waste water a treating agent selected from a group of Al compound, Ca compound and mixture thereof at temperature of 50 to 300° C. for reaction, whereby boron trifluoride neutralized salt is decomposed to form Al salt or Ca salt of fluorine component so that the fluorine component is removed in the form of Al salt or Ca salt of fluorine component.

The method for treating waste water according to the present invention removes enoughly fluorine component from waste water containing high concentration of fluorine component, thereby reducing the fluorine component contained in waste water to less than 15 ppm which is the legal limit of fluorine discharge amount in the unit plant. Accordingly, the present invention protects the environment of river or ocean to which the waste water is finally discharged, and enables the realization of eco-friendly plant which prevents contamination of the aquatic plants and the fishery.

DETAILED DESCRIPTION OF THE INVENTION

A more complete appreciation of the invention, and many of the attendant advantages thereof, will be better appreciated by reference to the following detailed description.

The waste water containing high concentration fluorine component is produced, for example, as a by-product during the preparation of high reactive polybutene. As is known, C4 olefin component which is derived from the decomposition of naphtha is polymerized under boron trifluoride ($BF_3$) complex or a promoter/boron trifluoride, to prepare the high reactive polybutene. The polymerization reaction can be carried out in continuous type or batch type. When the polymerization reaction is completed, the polymerization reaction product containing polybutene is washed with water or sodium hydroxide solution (caustic solution), removing the impurities from the polymerization reaction product and non-activating boron trifluoride of a catalyst (refining or washing step). In this time, is generated the waste water containing much fluorine (F) component including fluoride, boron trifluoride neutralized salt etc. The washing step can be performed one or more times, preferably 1 to 3 times. The waste water which is produced by washing the polymerization reaction product with water or sodium hydroxide solution contains fluorine component of 5,000 to 20.000 ppm, which varies depending on the polybutene reaction conditions. About 90% of the fluorine component is in the form of NaF or HF, and the remaining 10% is in the form of boron trifluoride neutralized salt. The boron trifluoride neutralized salt can be represented by following Formula 1.

$M(BF_4)x$            [Formula 1]

In Formula 1, x is an integer of 1 to 3, M is H, $NH_3$, amine group, Na, K, Ca, Ba, Cs etc. Example of amine group includes aniline, TEA(triethylamine), TETA(triethyltetraamine), TEPA(triethylpentaamine), ethanolamine, piridine and so on.

The present method for treating such waste water containing high concentration of fluorine components comprises (a) a step of removing fluoride, (b) a step of removing boron trifluoride neutralized salt and (c) a step of removing a very small amount of remaining fluoride component, and (a) step and/or (c) step may be omitted depending on the necessity.

In (a) step (fluoride removal step, basic step), depending on the necessity, the waste water produced during the washing step is introduced into a reactor and then Ca compound is added to the waste water at a temperature of 0 to 40° C., preferably 10 to 30° C., more preferably at room temperature (25° C.) so that the fluoride is converted into insoluble salt of calcium fluoride ($CaF_2$), being precipitated and agglomerated, and the precipitate is removed by filtration. Here, if the temperature is less than 0° C. the waste water may be frozen, or unnecessarily additional cost is needed for cooling the waste water. If the temperature is more than 40° C., unnecessarily additional cost is needed for heating the waste water, and solubility of insoluble salt of calcium fluoride ($CaF_2$) rises so that it is worried that calcium fluoride ($CaF_2$) dissolved in water may be again precipitated at end step of waste water treating process. Examples of Ca compound used in the fluoride removal step include calcium chloride ($CaCl_2$), calcium hydroxide ($Ca(OH)_2$), calcium sulfate ($CaSO_4$), Calcium phosphate ($Ca_3(PO_4)_2$), and mixture thereof The use amount of Ca compound is 1 to 2equivalent weight, preferably 1 to 1.5 equivalent weight with respect to the fluorine component contained in the waste water, preferably with respect to the fluorine component to be removed in the present step. When the amount of Ca compound is too little, the fluorine component cannot be removed by a desired amount, and when the amount of Ca compound is too much, it is only economically undesirable without specifically benefits. The fluorine component to be removed by the reaction with Ca compound is fluoride in the form of NaF or HF. The waste water after the fluoride removal contains fluorine component of 500 to 2,000 ppm (corresponding to 10% of initial fluorine component amount) whose main is boron trifluoride neutralized salt.

In (b) step (boron trifluoride salt removal step, first step), a treating agent selected from a group of Al compound, Ca compound and mixture thereof is added to the waste water containing boron trifluoride neutralized salt (for example waste water after the fluoride removal step) at 50 to 300° C., preferably 60 to 200° C., more preferably 80 to 120° C., and the reaction is carried out to decompose boron trifluoride neutralized salt, form insoluble salt such as aluminum salt or calcium salt having fluorine component. Then, filtration is carried out to remove the insoluble salt. Here, if the reaction temperature is less than 50° C., decomposition of the boron trifluoride neutralized salt may be not enough. If the temperature is more than 300° C., the vapor pressure of water containing a strong acid so that to cope with this, the strong reactor is needed and also energy more than the necessary is consumed. It is preferable to use Al compound as the treating agent. As Al compound, aluminum phosphate ($AlPO_4$), aluminum sulfate($Al_2(SO_4)_3$), aluminum hydroxide($Al(OH)_3$), and mixture thereof can be used. As Ca compound, calcium chloride($CaCl_2$), calcium hydroxide($Ca(OH)_2$), calcium sulfate($CaSO_4$), calcium phosphate($Ca_3(PO_4)_2$), and mixture thereof can be used. The amount of the treating agent is 1 to 2 equivalent weight, preferably 1 to 1.5 equivalent weight with respect to the fluorine component contained in the waste water, preferably with respect to the fluorine component to be removed in the present step. When the amount of the treating agent is too little, the fluorine component cannot be removed by a desired amount, and when the amount of treating agent is too much, it is only economically undesirable without specifically benefits. Adding the treating agent makes the boron trifluoride neutralized salt to be removed so that the amount of fluorine component in the waste water is reduced to the level of 15 ppm.

In (c) step (remaining fluoride component removal step, second step), the waste water in which the boron trifluoride neutralized salt is removed is cooled down to 0 to 40° C., preferably 10 to 30° C., more preferably room temperature (25° C.) and a treating agent selected from a group of Al compound, Ca compound and mixture thereof is added to the waste water. Then, insoluble salt is formed with adsorption of residual fluorine, and the insoluble salt is subjected to flocculation treatment or filtration treatment so that the amount of fluorine component in the waste water is reduced to less than 10 ppm. Here, if the temperature is less than 0° C., waste water may be frozen or unnecessarily additional cost is needed for cooling the waste water, and if the temperature is more than 40° C., unnecessarily additional cost is needed for heating the waste water, and solubility of insoluble salt of calcium fluoride ($CaF_2$) rises so that it is worried that calcium fluoride ($CaF_2$) dissolved in water may be again precipitated at end step of waste water treating process. The amount and kind of Al compound and/or Ca compound are the same as those employed in the step (b). Finally through the remaining fluoride component removal step, the waste water containing fluorine component of less than 10 ppm is produced and without additional treating process, discharged to rivers or seas.

According to the method for treating waste water containing fluorine, the high concentration of fluorine component in the waste water is removed to reduce a low concentration level (less than 15 ppm) which does not influence the growth of aquatic organisms.

[Mode for the Invention]

Hereinafter, the present invention will be described in more detail through following Preparations and Examples. Following Preparations and Examples is for a better understanding of the present invention, by which the present invention is not limited.

PREPARATION

Preparation of High Reactive Polybutene

Isopropyl alcohol and boron trifluoride complex catalyst (isopropyl alcohol: boron trifluoride=1.45:1, by weight) and the reaction raw material having a composition shown in Table 1 (C4-residue-1) were continuously introduced to a stainless-steel pressure reactor equipped with a cooling device, with maintaining the temperature at −23.0° C. so as for 0.20 weight part of $BF_3$ with respect to 100 weight part of isobutene to be introduced. The pressure of the reactor was maintained over 3 kg/cm² so as for the reaction raw material to be maintained in liquid phase, the retention time of the reaction raw material was 30 minutes. After 180 minutes, the polymerization product was discharged from an outlet of the reactor, and then passed through a vessel in which sodium hydroxide 5 wt % (NaOH) solution is contained, thereby neutralizing the catalyst component, and then the polymerization reaction was stopped. The amount of fluorine component contained in the waste water produced during the above-mentioned process was 8530 ppm. The polymerization product was washed by water three times. Then C4 and low boiling point components were removed by using a primary distillation unit and the remaining low boiling point components was removed by stripping for 30 minutes at 220° C. and 5 mmHg by using second distillation unit, thereby obtaining high reactive polybutene. The molecular weight of the obtained polybutene was measured by GPC (Gel permeation chromatography), the amount of vinylidene therein was measured with C13-NMR. The conversion ratio of the isobutene was 84% (amount of isobutene after the reaction is 15%), number average molecular weight (Mn) is 2340, polydispersity (Pd) is 1.88 and the amount of vinylidene is 87%.

Examples 1~4, Comparative Examples 1~3

Treatment of Waste Water Containing fluorine component

The waste water having 8530 ppm of fluorine produced during the preparation of high reactive polybutene was treated with temperature condition and compound shown in following Table 2, removing the fluorine contained in the waste water. The compound for treating waste water used at each step was about 1.2 equivalent weight with respect to the fluorine concentration. The final amount of fluorine component in the waste water which was treated with respective reaction condition and compound was measured, which was shown in following Table 2. In Table 2, "basic step" represents the fluoride removal step, "1st step" represents the boron trifluoride salt removal step and "2nd step" represents the remaining fluoride component removal step.

TABLE 2

| | Operating conditions | Example 1 | Example 2 | Example 3 | Example 4 | Comparative Example 1 | Comparative Example 2 | Comparative Example 3 |
|---|---|---|---|---|---|---|---|---|
| Basic step | 25° C. | $CaCl_2$ | — | — | — | $Ca(OH)_2$ | $Ca(OH)_2$ | |
| 1st step | 95° C. | $Al_2(SO_4)_3$ | $AlPO_4$ | $Al_2(SO_4)_3$ | $Al_2(SO_4)_3$ | — | — | — |
| 2nd step | 25° C. | $AlPO_4$ $CaCl_2$ | $AlPO_4$ $CaCl_2$ | $Al_2(SO_4)_3$ $Ca(OH)_2$ | — | — | $Al_2(SO_4)_3$ $Ca_3(PO_4)_2$ | $AlPO_4$ $Ca(OH)_2$ |
| Amount of Fluorine component (ppm) | | 3 | 9 | 7 | 13 | 930 | 524 | 830 |

As shown in Table 2, when only the general method for removing fluorine (precipitation and agglomeration method using a calcium salt) is used (Comparative Example 1), the amount of remaining fluorine in the waste water is very high of 930 ppm, which means that boron trifluoride neutralized salt is contained in the waste water, and cannot be removed only by the conventional precipitation and agglomeration method using a calcium salt. In case where additional agglomeration of fluorine component at room temperature using Al compound and Ca compound follows the conventional Ca compound treatment, as shown in Comparative Example 2 and in case where agglomeration of fluorine component is carried only one time at room temperature using Al compound and Ca compound, as shown in Comparative Example 3, the amount of remaining fluorine in the waste water is 524 ppm and 830 ppm, respectively, which are beyond 15 ppm, being the legal limit of fluoride discharge amount. On the other hand, when only the boron trifluoride salt removal step (first step) is carried out (Example 4), the amount of remaining fluorine in the waste water is reduced to 13 ppm. Also, when both the boron trifluoride salt removal step (first step) and the remaining fluoride component removal step (second step) are carried out (Example 1 to Example 3). the amount of remaining fluorine in the waste water is remarkably reduced to less than 10 ppm regardless of application of the basic step. Specifically, when all steps of the fluoride removal step (basic step), the boron trifluoride salt removal step (first step) and the

TABLE 1

| component | isobutene | n-butane | 1-butene | C-2-butene | T-2-butene | i-butene |
|---|---|---|---|---|---|---|
| Amount (weight %) | 49.5 | 9.7 | 24.8 | 4.2 | 8.4 | 3.4 | remaining fluoride component removal step (second step) are carried out (Example 1), the amount of the remaining fluorine in the waste water is 3 ppm, which satisfies drinking water standards The fluorine contained in the waste water which is discharged from an unit plant should be controlled to less than 15 ppm. If the fluorine amount discharged is 15 ppm or more, river or marine environment is polluted, aquatic organisms have rotten dead or undesirable effect works on the body of human who eats the polluted aquatic organisms. However, the present invention enables the amount of fluorine component to be less than 15 ppm, thus the plant can be environment-friendly operated.

What is claimed is:

1. A method for treating waste water containing a fluorine component including boron trifluoride neutralized salt, comprising the steps of:
    adding to the waste water a treating agent selected from the group consisting of an Al compound, a Ca compound and mixtures thereof at a reaction temperature of 50 to 300° C. thereby decomposing the boron trifluoride neutralized salt to form an Al salt or an Ca salt of the fluorine component;
    removing the Al salt or the Ca salt of the fluorine component from the waste water;
    adding to the waste water, after the step of removing the Al salt or the Ca salt of the fluorine component, the treating agent selected from the group consisting of an Al compound, a Ca compound and mixtures thereof at a temperature of 0 to 40° C. whereby any remaining fluoride component forms an insoluble salt;
    removing the insoluble salt;
    prior to the step of adding the treating agent to the waste water at the temperature of 50 to 300° C., adding a Ca compound to the waste water at a temperature of 0 to 40° C. thereby converting fluorine ions in the waste water into an insoluble salt of calcium fluoride ($CaF_2$); and
    removing the insoluble salt of calcium fluoride ($CaF_2$) from the waste water; and
    wherein the waste water containing a fluorine component including boron trifluoride neutralized salt is a by-product of a polybutene preparation process.

2. The method as claimed in claim 1, wherein the Al compound is selected from the group consisting of aluminum phosphate($AlPO_4$), aluminum sulfate($Al_2(SO_4)_3$), aluminum hydroxide($Al(OH)_3$), and mixtures thereof, and the Ca compound is selected from the group consisting of calcium chloride($CaCl_2$), calcium hydroxide($Ca(OH)_2$), calcium sulfate($CaSO_4$), calcium phosphate($Ca_3(PO_4)_2$), and mixtures thereof.

3. The method as claimed in claim 1, wherein the amount of the treating agent is 1 to 2 equivalent weight, with respect to the fluorine component contained in the waste water.

* * * * *